US 9,172,532 B1

(12) United States Patent
Fuller et al.

(10) Patent No.: US 9,172,532 B1
(45) Date of Patent: Oct. 27, 2015

(54) MULTI-TIERED ENCRYPTION SYSTEM FOR EFFICIENTLY REGULATING USE OF ENCRYPTION KEYS

(71) Applicant: Amazon Technologies, Inc., Reno, NV (US)

(72) Inventors: Erik James Fuller, Cape Town (ZA); Adam Blair Kelly, Victoria (CA); KMR Mumit Khan, Victoria (CA); Timothy Peter Munro, Victoria (CA); Andrew Norimasa Nishigaya, Victoria (CA); Kerry Michael Wright, Victoria (CA)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 14/084,440

(22) Filed: Nov. 19, 2013

(51) Int. Cl.
*H04L 9/08* (2006.01)

(52) U.S. Cl.
CPC ............ *H04L 9/0822* (2013.01); *H04L 2209/24* (2013.01)

(58) Field of Classification Search
CPC ....................................................... H04L 9/08
USPC ............................................................. 380/44
See application file for complete search history.

(56) References Cited

U.S. PATENT DOCUMENTS

| 7,043,024 | B1 * | 5/2006 | Dinsmore et al. | 380/278 |
|---|---|---|---|---|
| 8,205,085 | B2 * | 6/2012 | Yao | 713/171 |
| 8,966,580 | B2 * | 2/2015 | Sela et al. | 726/2 |
| 2003/0159037 | A1 * | 8/2003 | Taki et al. | 713/168 |
| 2003/0185396 | A1 * | 10/2003 | Asano et al. | 380/277 |
| 2004/0260921 | A1 * | 12/2004 | Treadwell | 713/150 |
| 2005/0271210 | A1 * | 12/2005 | Soppera | 380/277 |
| 2007/0230706 | A1 * | 10/2007 | Youn | 380/277 |
| 2011/0075847 | A1 * | 3/2011 | Rossi | 380/279 |
| 2011/0099362 | A1 * | 4/2011 | Haga et al. | 713/2 |

* cited by examiner

*Primary Examiner* — William Powers
(74) *Attorney, Agent, or Firm* — Knobbe, Martens, Olson & Bear, LLP

(57) ABSTRACT

A multi-tiered encryption system efficiently regulates the use of encryption keys to encrypt and decrypt data. The system can include one or more encryption tiers. Each encryption tier can include a computing node programmed to service encryption and/or decryption requests and a key store to store encryption keys. At a root encryption tier, an unencrypted root encryption key can be stored in the key store. Each subsequent encryption tier includes encryption keys that are encrypted by encryption keys stored at a lower encryption tier. The encryption tiers collectively implement an encryption policy in which keys are automatically created and rotated such that a requesting device can request encryption services from the multi-tiered encryption system and receive the encryption services independent of key creation or key rotation and without access to the unencrypted root encryption key.

25 Claims, 4 Drawing Sheets

MULTI-TIERED ENCRYPTION SYSTEM FOR EFFICIENTLY REGULATING USE OF ENCRYPTION KEYS

BACKGROUND

Often, one electronic device transmits sensitive data to another electronic device. To protect such data, an electronic device may encrypt the sensitive data before transmission. Once the transmission reaches the intended recipient, the intended recipient may decrypt the transmitted data to extract the sensitive data. In some cases, the electronic devices may request an external service to perform the encryption and decryption via a network. Encryption and decryption can be processor intensive, so requesting an external service to perform such services can allow the electronic devices to dedicate resources to other necessary processes.

Devices, such as hardware security modules (HSMs), can house external encryption and decryption services. In some instances, HSMs operate by encrypting or decrypting data using one or more keys. HSMs may also operate under a set of encryption policies. Encryption policies mandate how the data is handled and how the keys are used. For example, the encryption policies may dictate how a service is supposed to operate if a key is compromised.

While offloading encryption and decryption to HSMs may ease the burden placed on electronic devices, HSMs may introduce additional constraints. For example, the encryption policies enforced by HSMs may limit the total amount of data that can be encrypted, the total number of encrypt operations for a single key, or the total amount of time a key can be used. In addition, because the HSMs are accessed over a network, requesting and receiving encrypted or decrypted data can be latency sensitive. Finally, HSMs can be expensive to implement and operate.

DETAILED DESCRIPTION

Figure 1:
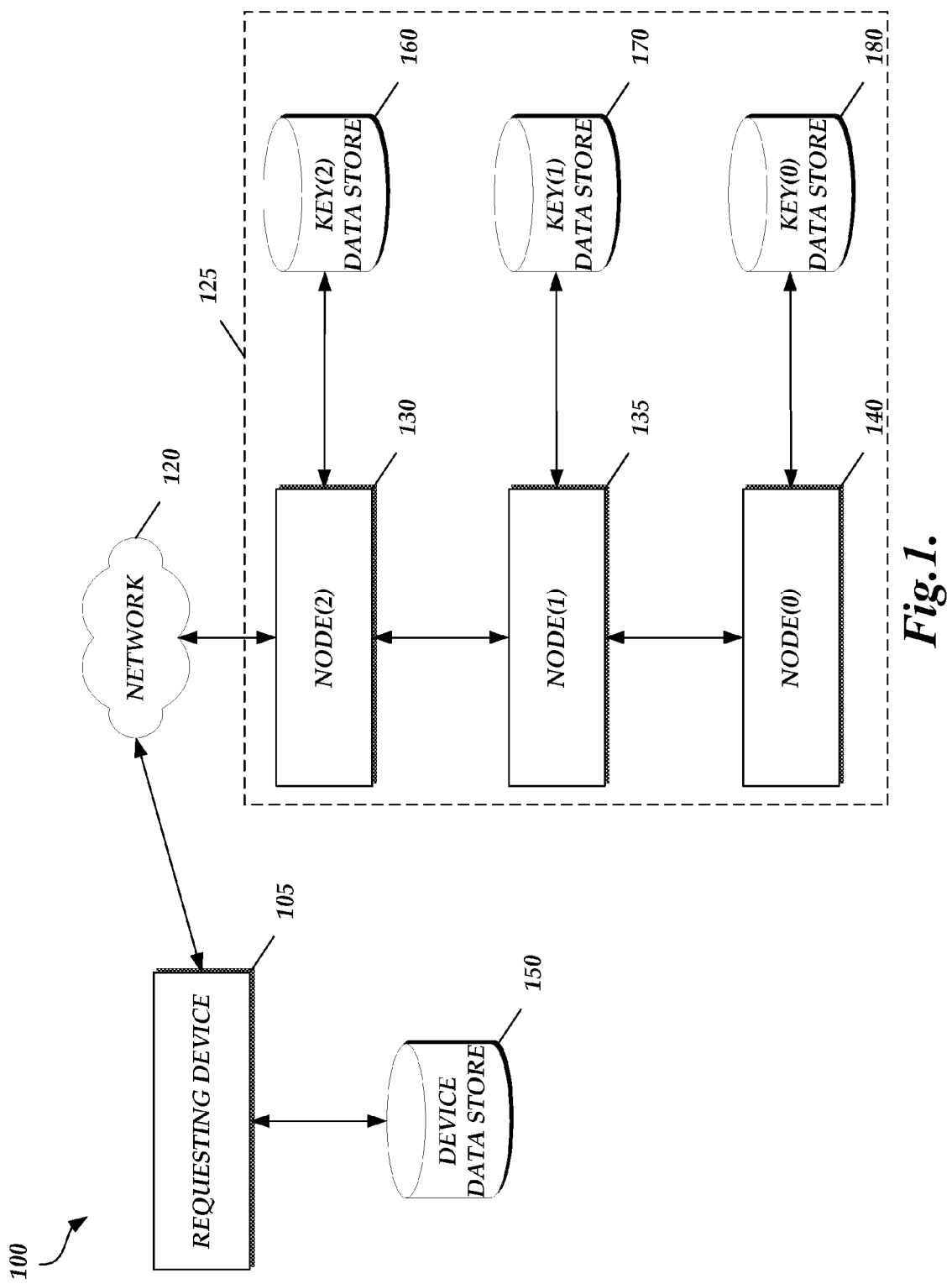
FIG. 1 illustrates a block diagram of a multi-tiered encryption service

As described above, devices, such as hardware security modules (HSMs), can be used to perform encryption and decryption services. HSMs can be accessed by electronic devices via a network and may use one or more keys to perform encryption and/or decryption. For example, HSMs may include a root or master key and one or more other keys that are used for encryption and/or decryption. In some HSMs, the root key can be used to derive the other keys. Thus, keeping the root key confidential may be critical to maintaining the integrity of data that has been encrypted by the HSM.

In addition, HSMs typically operate according to an encryption policy. The encryption policy may include procedures for handling data and keys to increase the likelihood that keys remain confidential. In particular, the encryption policy may be a statement, explicit or implied, that bounds the use of a particular encryption key. For example, the encryption policy may limit the use of an encryption key to a maximum number of encrypt operations (e.g., the encryption key may only be used to encrypt data 10,000 times), to a time limit (e.g., the encryption key may only be used for three months), or to a total payload (e.g., the encryption key may only be used to encrypt 10 GB of data). By limiting the use of an encryption key, the likelihood that an encryption key could be reverse-engineered or otherwise compromised is reduced.

On the other hand, because the use of an encryption key is not limitless, the encryption policy may further include procedures for rotating encryption keys (e.g., selecting another encryption key to take the place of an encryption key that can no longer be used to encrypt data). In some instances, it may be undesirable to rotate a root key because other keys may depend on the root key and rotation of the root key can leave the root key vulnerable to detection. Thus, the encryption policy may limit the functionality of an HSM. Because of the constraints on the use of encryption keys, additional keys may need to be generated or additional HSMs may need to be implemented. HSMs, though, can be expensive. Implementing additional HSMs may further exacerbate any latency issues.

Accordingly, a multi-tiered encryption system is described herein, which addresses the constraints described above and provides additional benefits. A multi-tiered encryption system can include one or more encryption tiers. Each encryption tier can include a computing node (e.g., a computing device comprising one or more processors coupled to a memory) programmed to service encryption and/or decryption requests and a key store (e.g., a computer-readable storage medium) to store encryption keys. Furthermore, each encryption tier can execute instructions to encrypt an unencrypted payload and/or to decrypt an encrypted payload.

As an example, the multi-tiered encryption system can be referred to as an n-tiered encryption system. The encryption tier identified as Tier(n) can be the encryption tier that interfaces directly (via a network) with various electronic devices that request encryption and/or decryption services. Each of the remaining encryption tiers (e.g., identified as Tier(0), Tier(1), Tier(2), . . . Tier(n−1)) can be considered infrastructure encryption tiers that support the encryption and/or decryption service. As used herein, Tier(n) is referred to as the highest encryption tier and Tier(0) is referred to as the lowest encryption tier. Thus, Tier(2), for example, is an encryption tier that is higher than Tier(0) and lower than Tier(n).

Tier(0) is the encryption tier that includes a key store that stores one or more root encryption keys. In some instances, the root encryption keys are unencrypted and stored as such, meaning they are not encrypted by other keys in the n-tiered encryption system. The remaining infrastructure encryption tiers can include key stores that store one or more encrypted encryption keys. The one or more encrypted encryption keys may be encrypted by encryption keys stored in a key store included in a lower encryption tier. For example, the encrypted encryption keys stored in a key store included in Tier(m), where m>0, can be encrypted by encryption keys stored in a key store included in any of Tier(0) through Tier(m−1). Generally, however, encrypted encryption keys stored in a key store included in a first encryption tier are encrypted by encryption keys stored in a key store included in the encryption tier immediately below the first encryption tier (e.g., the encrypted encryption keys stored in a key store included in Tier(m), where m>0, are encrypted by encryption keys stored in a key store included in Tier(m−1)). Thus, an unencrypted root encryption key stored in the key store included in Tier(0) can be used to encrypt one or more encryption keys associated with Tier(1). One or more encryption keys associated with Tier(1) can be used to encrypt one or more encryption keys associated with Tier(2), and so on. The encrypted Tier(1) encryption keys can be stored in a key store included in Tier(1), the encrypted Tier(2) encryption keys can be stored in a key store included in Tier(2), and so on.

In an embodiment, the multi-tiered encryption system includes encryption policies, such as use-based key rotation policies, access policies, and revocation handling policies. For example, the key rotation policy may globally (for all tiers) specify that an encryption key can only be used for at most M encryption operations. If an encryption key stored in a key store included in a particular encryption tier is used for M encrypt operations, the encryption tier can create or obtain a new encryption key to fulfill an M+1$^{th}$ encrypt request.

Generally, an n-tiered encryption system with a limit of M encrypt operations per encryption key can perform a maximum of $M^{n+1}$ encrypt operations without having to rotate a root encryption key. As an example, M could be 10,000. Thus, a root encryption key stored in a key store included in Tier(0) can perform 10,000 encrypt operations. In particular, the root encryption can be used to encrypt 10,000 encryption keys stored in a key store included in Tier(1). Likewise, each of the 10,000 encryption keys stored in a key store included in Tier(1) can perform 10,000 encrypt operations. Accordingly, by introducing Tier(1), the multi-tiered encryption system can perform 100,000,000 encrypt operations before a key rotation takes place at Tier(0) (e.g., before a new root key is created at Tier(0)). If Tier(2) is introduced, then the number of encrypt operations that can be performed by the multi-tiered encryption system increases to 1,000,000,000,000.

In an embodiment, an electronic device can request encryption services from the multi-tiered encryption system. The encryption tier that interfaces with the electronic device via a network can receive data from the electronic device and perform encryption of the data using a single encryption key. If use of the single encryption key has reached a limit as defined by the use-based rotation policy such that a pending encrypt operation would violate the rotation policy, the encryption tier generates a new encryption key for the pending encrypt operation.

The encrypted data and a reference to the literal encryption key used to encrypt the data can be returned to the electronic device. Thus, the electronic device can provide the reference along with encrypted data when requesting decryption of the encrypted data (e.g., yielding O(1) performance in locating the encryption key to use when performing the decryption). For example, the multi-tiered encryption system could provide the encrypted data and metadata (e.g., a reference to the literal encryption key and/or other relevant information) to the electronic device as logically separate entities (e.g., within two separate data packets) or as logically same entities (e.g., the metadata could be embedded within the encrypted data such that inclusion of the metadata takes place without the awareness of the user of the electronic device).

In some embodiments, logical encryption keys can be used by the multi-tiered encryption system to provide additional flexibility. Logical encryption keys may exist to allow electronic devices the option of having different encryption policies (e.g., use-based rotation policies) linked to encrypt and decrypt operations. In particular, logical encryption keys may allow the multi-tiered encryption system to manage encryption keys under different configurations and/or policies.

A logical encryption key can be provided to an electronic device. When requesting an encrypt operation, the electronic device can provide the logical encryption key and the data to be encrypted. The multi-tiered encryption system can then de-reference the logical encryption key to identify a literal encryption key. The literal encryption key can be used to perform the actual encryption. If the literal encryption key is exhausted according to the use-based rotation policy, then the multi-tiered encryption system can generate a new literal encryption key to take the place of the exhausted literal encryption key such that an association is established between the new literal encryption key and the logical encryption key. The new literal encryption key can then be used to perform the actual encryption and can be used in subsequent encrypt operations until the use-based rotation policy dictates that a second new literal encryption key should be generated.

Generally, an encryption tier creates a new literal encryption key every M encrypt operations, assuming each encryption key is limited to M encrypt operations. Because an encryption tier may only contact the next lowest encryption tier when a new literal encryption key is generated (e.g., so that the new literal encryption key can be encrypted using an encryption key stored in a key store included in the next lowest encryption tier), the performance requirements of Tier (m−1) can be 1/M of Tier(m). In other words, Tier(m−1) may have 1/M the nodes as Tier(m), assuming the nodes at each encryption tier are of equal or nearly equal performance. Thus, each successive lower encryption tier may have an exponentially smaller number of nodes, providing a buffer for operating requirements at Tier(0) (e.g., the operating requirements at Tier(0) may be reduced via use of the tiered encryption system).

In an embodiment, as the number of encrypt requests increases or decreases, the multi-tiered encryption system expands or contracts dynamically. For example, the multi-tiered encryption system can be configured to evaluate the operating requirements of any encryption tier. If an encryption tier is underperforming, then the number of nodes included in the encryption tier can be increased. If an encryption tier is overprovisioned (e.g., not used as often as expected), then the number of nodes included in the encryption tier can be decreased. The evaluation performed by the multi-tiered encryption system can be based on scaling policies (e.g., one or more rules that result in outcomes of scale up, scale down, no change, etc.). The scaling policies can be managed by the multi-tiered encryption service or by an external service or system.

The multi-tiered encryption system can implement additional policies to scale dynamically. For example, the multi-tiered encryption system can implement redundancy and availability policies (e.g., policies that dictate the instantiation and operation of nodes to optimize for redundancy and availability), health policies (e.g., policies that dictate if a node is healthy or not in order to replace unhealthy nodes), performance policies (e.g., policies that dictate when changes are required to the computing power of a node, such as temporary or permanent increase in RAM, temporary or permanent increase in CPU speed, etc.), and/or the like.

In some embodiments, the multi-tiered encryption system can dynamically add or remove encryption tiers. For example, when the encryption key of the encryption tier that interfaces with the electronic device is exhausted, the multi-tiered encryption system may rotate the root encryption key such that additional encryption keys can be generated at all encryption tiers higher than Tier(0). However, in order to avoid root encryption key rotation, the multi-tiered encryption system could instead add a new encryption tier with which the electronic device interfaces. If the multi-tiered encryption system is an n-tiered encryption system, then the multi-tiered encryption system could add Tier(n+1), which then serves as the interface with the electronic device.

An access policy can be used in multi-tiered encryption systems where identities are known (e.g., identities of the electronic devices' requested services). An access policy, such as an Aspen-based policy, can be used to restrict access to and use of an encryption key.

In an embodiment, an encryption key can be revoked according to a revocation policy. The revocation policy may further determine the reassignment and re-encryption of additional encryption keys. Generally, for a literal encryption key that is set to be revoked at a given encryption tier, each literal encryption key that is encrypted directly or indirectly from the revoked literal encryption key is re-encrypted directly or indirectly using a literal encryption key that is not set to be revoked at the given encryption tier. For example, a literal encryption key at Tier(m) can be marked indicating that the revocation of the literal encryption key is pending. Any other literal encryption keys at Tier(m) that are to be revoked can be similarly marked. The marked Tier(m) literal encryption keys can be added to a revocation list associated with Tier(m). The revocation list can be a list or file available from a predefined endpoint or as part of a service definition at each encryption tier and/or indicated in an internal or external notification system. Tier(m+1) can analyze the Tier(m) revocation list and mark Tier(m+1) literal encryption keys that have been encrypted using one of the literal encryption keys in the Tier(m) revocation list as revocation is pending. The marked Tier(m+1) literal encryption keys can then be re-encrypted using an unmarked or new Tier(m) literal encryption key. The marked Tier(m+1) literal encryption keys can then be added to a revocation list associated with Tier(m+1). The process may repeat until Tier(n) is reached.

Once at Tier(n), electronic devices and/or other devices external to the multi-tiered encryption system may review and analyze the revocation list(s), re-encrypt some or all data associated with the market literal encryption keys, and/or acknowledge the revocation of the literal encryption keys. Once the revocation is acknowledged, the marked Tier(n) literal encryption keys can be re-marked as revoked. An acknowledgment request can be transmitted to Tier(n−1), which then repeats the process until Tier(m) is reached and all marked literal encryption keys are re-marked as revoked. While the literal encryption keys are revoked for encrypt operations, the literal encryption keys may still be available for decrypt operations.

In this way, the multi-tiered encryption system provides one or more benefits. For example, each encryption tier can reduce the load on the lowest encryption tier (e.g., Tier(0)), possibly by several orders of magnitude. Higher encryption tiers, such as Tier(1), may be able to cache unencrypted versions of their encryption keys in memory, reducing the number of reads and/or writes made to the lowest encryption tier and thus the likelihood of needing to scale the lowest encryption tier. Reducing the likelihood of needing to scale the lowest encryption tier can provide cost savings, especially when the lowest encryption tier is implemented using expensive or difficult to provision hardware (e.g., an HSM).

As another example, the multi-tiered encryption system may provide extra layers of protection for lower level encryption keys. Even if an encryption key at Tier(2) is compromised, the encryption key at Tier(1) used to encrypt the compromised encryption key and the root encryption key may still be protected and confidential. Furthermore, nodes at each encryption tier can be designed to only accept traffic from the next highest and/or the next lowest encryption tier.

As another example, and as described below, multiple encryption tiers can be housed within the same device and/or within the same local network. The proximity of the encryption tiers, coupled with the caching capabilities of the encryption tiers, can reduce latency and reduce the amount of communication between the multi-tiered encryption system and external systems.

As another example, the multi-tiered encryption system allows for encryption key rotation to occur independent of any electronic device via use of the logical encryption key. As described above, the logical encryption key references a literal encryption key used to encrypt data. However, if the literal encryption key can no longer be used, the logical encryption key can be associated with a new literal encryption key. Thus, electronic devices need not be informed of any encryption key rotation. The electronic devices can act as dummy devices by continuing to use the same logical encryption key to request encrypt operations even if encryption key rotation has occurred.

FIG. 1 illustrates a block diagram of a multi-tiered encryption service 100 according to one embodiment. As illustrated in FIG. 1, the multi-tiered encryption service 100 includes a requesting device 105, a network 120, a multi-tiered encryption system 125, and a device data store 150.

The requesting device 105 can be configured to submit encryption and/or decryption requests to the multi-tiered encryption system 125. Such requests can be made via the network 120. The requesting device 105 can retrieve data to be encrypted or decrypted and/or key references from the device data store 150.

In an embodiment, the requesting device 105 may be a user device, such as a computing device. For example, the requesting device 105 may be an electronic device, such as a cell phone, a smart phone, a tablet, a laptop, a personal digital assistant (PDA), a computer, a desktop, a workstation, an electronic book reader, a set-top box, a camera, an audiobook player, a digital media player, a video game console, a server, a terminal, a kiosk, a clock, an augmented reality device, or the like. The requesting device 105 may include a microphone, a speaker, a wireless module, a camera, and/or a display.

In an embodiment, the device data store 150 may store data that is to be encrypted, data that is to be decrypted, and/or key references that identify an encryption key used to encrypt already encrypted data. In some embodiments, the device data store 150 is a single data store. In other embodiments, the device data store 150 is distributed over many different locations.

The network 120 may be a wired network, a wireless network, or a combination of the two. For example, the network 120 may be a personal area network, a local area network (LAN), a wide area network (WAN), or combinations of the same. Protocols and components for communicating via any of the other aforementioned types of communication networks, such as the TCP/IP protocols, can be used in the network 120.

In an embodiment, the multi-tiered encryption system 125 is configured to perform any or all of the operations disclosed herein. As illustrated in FIG. 1, the multi-tiered encryption system 125 includes node(2) 130, node(1) 135, node(0) 140, key(2) data store 160, key(1) data store 170, and key(0) data store 180. While the particular multi-tiered encryption system 125 illustrated in FIG. 1 is a three-tiered encryption system, this is not meant to be limiting. The number of tiers may alternatively be 2, 4, 5, 6, or any other positive integer. In addition, while each tier in the multi-tiered encryption system 125 includes one node 130, 135, or 140, this is not meant to be limiting. The number of nodes per tier may alternatively be 2, 3, 4, 5, 6, or any other positive integer. Furthermore, while each node 130, 135, and 140 is associated with a separate key data store 160, 170, and 180, this is not meant to be limiting, as one or more of the key data stores 160, 170, and/or 180 can be combined into a single key data store. For example, node(2) 130, node(1) 135, and/or node(0) 140 can share a key data store 160, 170, and/or 180. Moreover, any combination of nodes 130, 135, and/or 140 can be housed in the same device or different devices and any combination of nodes 130, 135, and/or 140 can be associated with the same local network.

In an embodiment, each node 130, 135, and 140 is a computing device comprising one or more processors coupled to a memory configured to service an encryption or decryption request. Each key data store 160, 170 and 180 can be a non-transitory computer-readable storage medium configured to store encryption keys. As referred to herein, node(0) 140 and key(0) data store 180 together can be considered Tier(0), node(1) 135 and key(1) data store 170 together can be considered Tier(1), and node(2) 130 and key(2) data store 160 can be considered Tier(2).

Tier(2) can serve as the interface between the multi-tiered encryption system 125 and the requesting device 105. In operation, the requesting device 105 can transmit an encryption or decryption request to node(2) 130 via the network 120. The request may include encrypted or unencrypted data and/or a key reference that identifies a literal encryption key that is used to encrypt or decrypt data. For example, the requesting device 105 transmits an encryption request to node(2) 130, where the request includes data to be encrypted. Node(2) 130 can retrieve an available encrypted encryption key (e.g., an unrevoked encryption key) from key(2) data store 160 for use in encrypting the data. In some embodiments, node(2) 130 also retrieves an identifier that identifies the encryption key used to encrypt the encryption key retrieved from key(2) data store 160.

Because the encryption key retrieved from key(2) data store 160 is encrypted, node(2) 130 may request a decrypt operation from node(1) 135, where the request includes the retrieved encryption key and/or an identifier of the encryption key used to encrypt the encryption key retrieved from key(2) data store 160. Node(1) 135 can then retrieve an encryption key from key(1) data store 170 and an identifier that identifies the encryption key used to encrypt the encryption key retrieved from key(1) data store 170, where the encryption key retrieved from key(1) data store 170 is the encryption key used to encrypt the encryption key retrieved from key(2) data store 160. In some embodiments, if node(2) 130 has previously requested that the encryption key retrieved from key(2) data store 160 be decrypted, the decrypted version of the encryption key retrieved from key(2) data store 160 may be stored in the memory (e.g., cache) of node(2) 130.

Like with the encryption key retrieved from key(2) data store 160, the encryption key retrieved from key(1) data store 170 is also encrypted. Thus, node(1) 135 may request a decrypt operation from node(0) 140, where the request includes the encryption key retrieved from key(1) data store 170 and/or an identifier of the encryption key used to encrypt the encryption key retrieved from key(1) data store 170. In some embodiments, if node(1) 135 has previously requested that the encryption key retrieved from key(1) data store 170 be decrypted, the decrypted version of the encryption key retrieved from key(1) data store 170 may be stored in the memory (e.g., cache) of node(1) 135.

As described above, unencrypted root encryption keys can be stored in Tier(0). Thus, node(0) 140 can retrieve a root encryption key from key(0) data store 180 that was used to encrypt the encryption key retrieved from key(1) data store 170. Node(0) can use the root encryption key to decrypt the encryption key retrieved from key(1) data store 170. The decrypted version of the encryption key retrieved from key(1) data store 170 can then be transmitted to node(1) 135.

Node(1) 135 can then use the decrypted version of the encryption key retrieved from key(1) data store 170 to decrypt the encryption key retrieved from key(2) data store 160. The decrypted version of the encryption key retrieved from key(2) data store 160 can then be transmitted to node(2) 130. Once the encryption key retrieved from key(2) data store 160 is decrypted, node(2) 130 can encrypt the data received from the requesting device 105. In some embodiments, the node(2) 130 transmits the encrypted data and a reference to the encryption key retrieved from the key(2) data store 160 back to the requesting device 105 to complete the encryption process.

In other embodiments, not shown, the multi-tiered encryption system 125 can be local to the requesting device 105. For example, the multi-tiered encryption system 125 can be executed by a processor embedded within the requesting device 105. As another example, the multi-tiered encryption system 125 can be executed by another device coupled directly to the requesting device 105 (e.g., via a wired or wireless connection, such as USB, IEEE 1394, IEEE 802.11, Bluetooth, etc.). The multi-tiered encryption system 125, when local to the requesting device 105, can perform any of the operations discussed herein.

Figure 2:
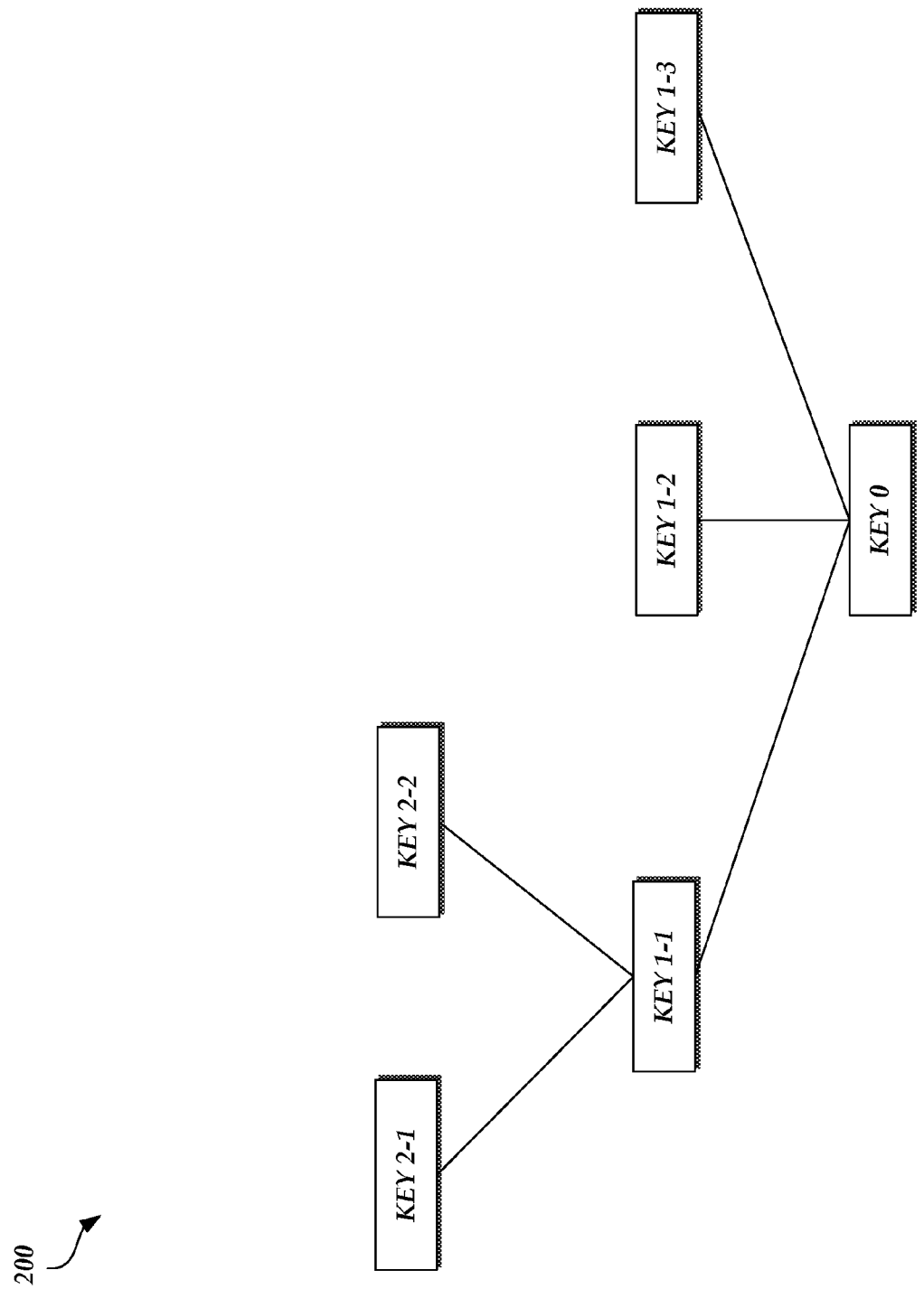
FIG. 2 illustrates a graph structure that presents the relationship between keys stored in a multi-tiered encryption service.

FIG. 2 illustrates a graph structure 200 that presents the relationship between keys stored in a multi-tiered encryption service. As illustrated in FIG. 2, the graph structure 200 includes 6 encryption keys: key 0, key 1-1, key 1-2, key 1-3, key 2-1, and key 2-2. In an embodiment, key 0 is stored in a key store included in Tier(0), keys 1-1, 1-2, and 1-3 are stored in a key store included in Tier(1), and keys 2-1 and 2-2 are stored in a key store included in Tier(2).

As an example, key 0 is used to encrypt key 1-1, key 1-2, and key 1-3. Key 1-1 is then used to encrypt key 2-1 and key 2-2. Thus, if key 2-1 or key 2-2 is to be used to encrypt data received from a user device, such as the requesting device 105, key 1-1 can be used to decrypt key 2-1 or key 2-2 and key 0 can be used to decrypt key 1-1.

In other embodiments, not shown, key 1-2 and/or key 1-3 may not be generated until key 1-1, key 2-1, and/or key 2-2 have been exhausted (e.g., compromised, use limit exceeded, etc.). For example, key 1-2 and key 1-3 may not be created a priori or before they need to be used. Rather, the multi-tiered encryption system can create key 1-2 and/or key 1-3 on-demand when a given policy dictates that additional keys are needed in Tier (1).

Figure 3:
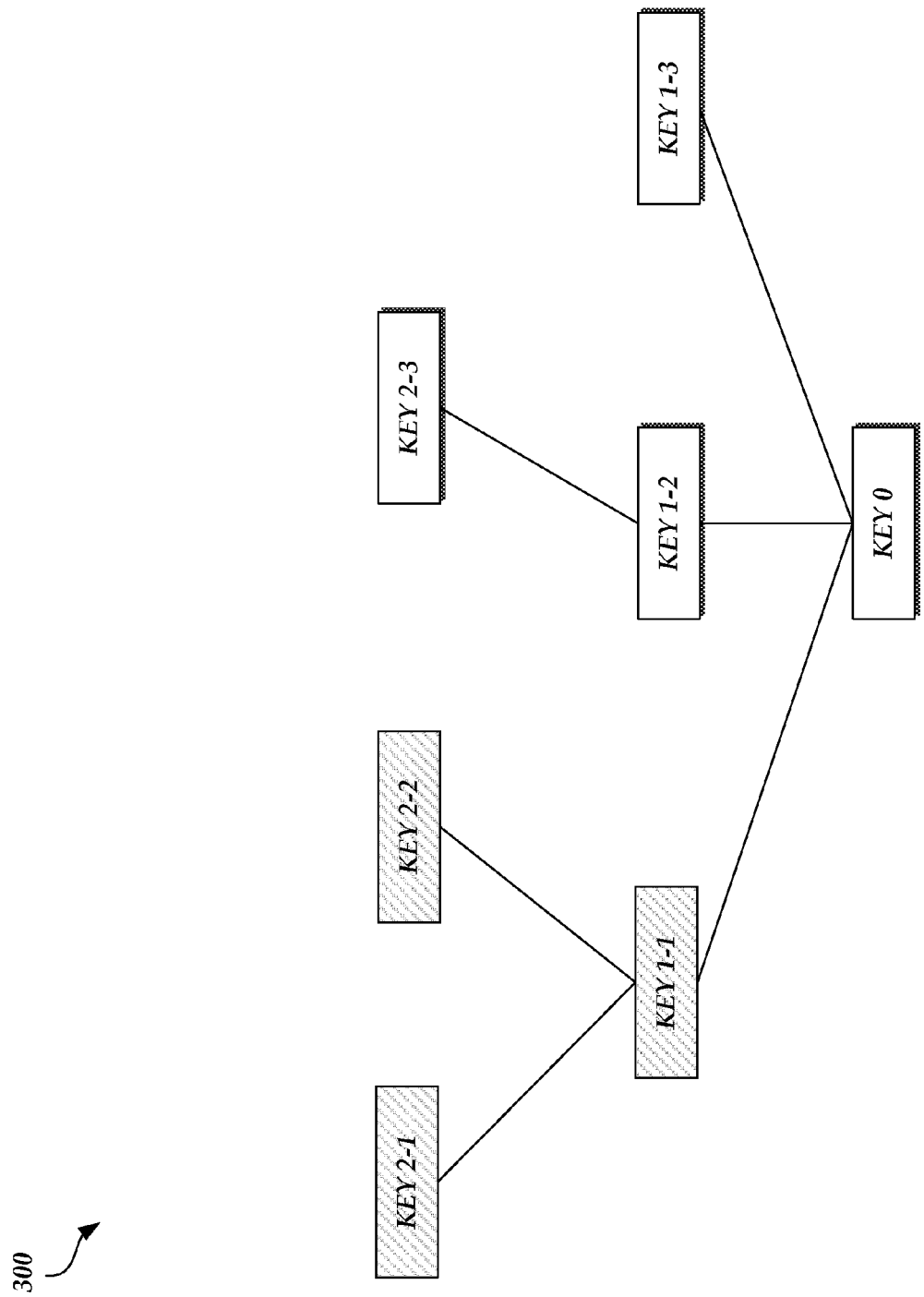
FIG. 3 illustrates a graph structure that presents the relationship between existing keys and new keys stored in a multi-tiered encryption service.

FIG. 3 illustrates a graph structure 300 that presents the relationship between existing keys and new keys stored in a multi-tiered encryption service. As illustrated in FIG. 3, the graph structure 300 includes 7 encryption keys: key 0, key 1-1, key 1-2, key 1-3, key 2-1, key 2-2, and key 2-3. In an embodiment, key 0 is stored in a key store included in Tier(0), keys 1-1, 1-2, and 1-3 are stored in a key store included in Tier(1), and keys 2-1, 2-2, and 2-3 are stored in a key store included in Tier(2).

As an example, key 0 is used to encrypt key 1-1, key 1-2, and key 1-3. Key 1-1 is then used to encrypt key 2-1 and key 2-2. If key 2-1 and key 2-2 are exhausted (e.g., compromised, use limit exceeded, etc.), Tier(2) may add an additional encryption key. The additional encryption key could be encrypted by key 1-1 if key 1-1 is not exhausted as well. For illustrative purposes, key 1-1, key 2-1, and key 2-2 are all exhausted. Thus, Tier(2) may add an additional encryption key, key 2-3, when an encrypt operation is pending. However, key 2-3 may be encrypted by key 1-2 instead of key 1-1 because key 1-2 is the next available encryption key in Tier (1). Thus, if key 2-3 is to be used to encrypt data received from a user device, such as the requesting device 105, key 1-2 can be used to decrypt key 2-3 and key 0 can be used to decrypt key 1-2.

In some embodiments, if key 1-1 is selected to be revoked (e.g., because key 1-1 has been hacked, stolen, or compromised), key 2-1 and key 2-2 can no longer be encrypted by key 1-1. Accordingly, key 2-1 and key 2-2 are identified as being encryption keys that are encrypted by an encryption key set to be revoked. The next available encryption key in Tier(1) can then be identified such that key 2-1 and key 2-2 can be re-encrypted by the next available encryption key. As an example, the next available encryption key in Tier(1) could be key 1-2. Thus, key 2-1 and key 2-2 could be encrypted by key 1-2.

Figure 4:
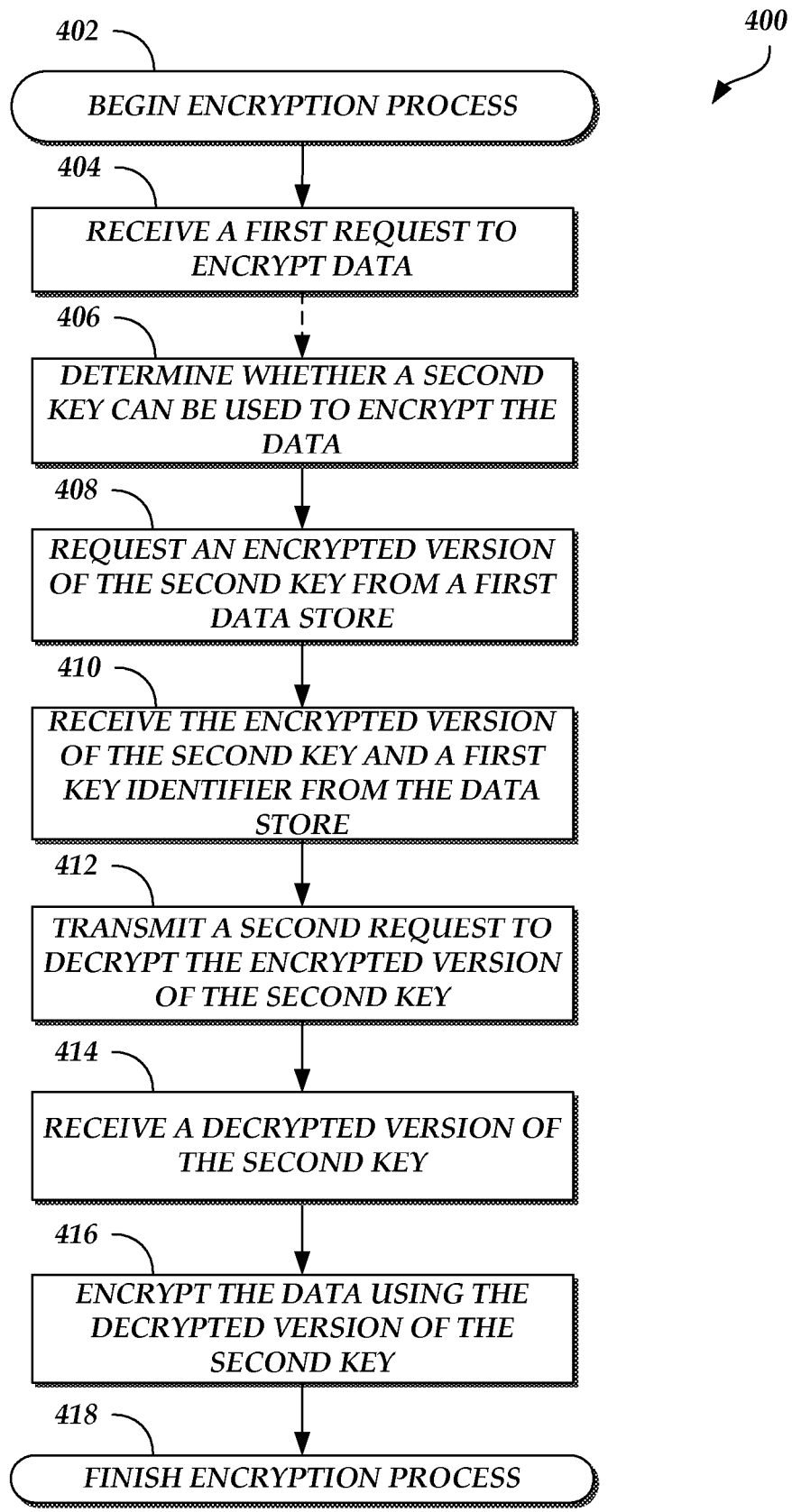
FIG. 4 illustrates a process that may be used by a computer system to encrypt data.

FIG. 4 illustrates an encryption process 400 that may be used by a computer system to encrypt data. As an example, the multi-tiered encryption system 125 of FIG. 1, and specifically node(2) 130 of FIG. 1, can be configured to execute the encryption process 400. The encryption process 400 begins at block 402.

At block 404, a first request to encrypt data is received. At block 406, whether a second key can be used to encrypt the data is determined. At block 408, an encrypted version of the second key is requested from a first data store. At block 410, the encrypted version of the second key and a first key identifier is received from the data store.

At block 412, a second request to decrypt the encrypted version of the second key is transmitted. At block 414, a decrypted version of the second key is received. At block 416, the data using the decrypted version of the second key is encrypted. After the data is encrypted, the encryption process may be complete, as shown in block 418.

All of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a hardware processor (or multiple hardware processors) that executes program instructions or modules stored in a memory or other computer-readable storage medium. Each such processor includes digital logic circuitry. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

For example, the functional components 105, 120, 125, 130, 135, and 140 shown in FIG. 1 may be implemented by a programmed computer system that comprises one or more physical computers or computing devices. Different components 105, 120, 125, 130, 135, and 140 may, but need not, be implemented on or by different physical machines. The various data repositories 150, 160, 170 and 180 shown in FIG. 1 may be implemented as databases, flat files, and/or any other type of computer-based storage system that uses persistent data storage devices to store data.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The foregoing embodiments are intended to be non-limiting. Other embodiments, including embodiments that do not provide all of the benefits and features set forth herein, are also within the scope of protection. Accordingly, the scope of protection is defined only by reference to the appended claims.

What is claimed is:

1. A computer-implemented method of encrypting data, the method comprising:

receiving, from a requesting device, a first request to encrypt data, wherein the first request comprises the data;

determining whether a first key can be used to encrypt the data;

requesting, in response to determining that the first key can be used to encrypt the data, an encrypted version of the first key from a first data store associated with a first node, wherein the first node is associated with a first tier of keys;

receiving the encrypted version of the first key and a parent key identifier from the data store, wherein the parent key identifier identifies a parent key stored in a second data store associated with a second node configured to decrypt the encrypted version of the first key, and wherein the second node is associated with a second tier of keys;

transmitting, to the second node, a second request to decrypt the encrypted version of the first key, wherein the second request comprises the encrypted version of the first key and the parent key identifier;

receiving, from the second node, a decrypted version of the first key, wherein the second node generates the decrypted version of the first key using the parent key after the parent key is retrieved from the second data store;

encrypting the data using the decrypted version of the first key;

generating a key identifier associated with the first key; and transmitting, to the requesting device, the encrypted data and the key identifier.

2. The computer-implemented method of claim 1, further comprising storing the decrypted version of the first key in a memory cache.

3. The computer-implemented method of claim 2, further comprising:

receiving, from the requesting device, a third request to decrypt the encrypted data, wherein the third request comprises the encrypted data and the key identifier;

determining that the key identifier is associated with the first key;

retrieving the decrypted version of the first key from the memory cache;

decrypting the encrypted data using the decrypted version of the first key; and transmitting, to the requesting device, the decrypted data.

4. The computer-implemented method of claim 1, further comprising determining that the first key can no longer be used to encrypt the data.

5. The computer-implemented method of claim 4, further comprising:

generating a second key;

transmitting, to the second node, a third request to encrypt the second key, wherein the third request comprises the second key and the parent key identifier;

receiving, from the second node, an encrypted version of the second key;

updating the key identifier so that the key identifier is associated with the second key;

storing the encrypted version of the second key in the first data store;

associating the parent key identifier with the second key; and encrypting the data using the second key; and transmitting, to the requesting device, the encrypted data and the updated key identifier.

6. The computer-implemented method of claim 4, wherein determining that the first key can no longer be used to encrypt the data comprises one of determining that an amount of data encrypted by the first key has exceeded a first threshold value or determining that a number of times that the first key has been used to encrypt all data has exceeded a second threshold value.

7. The computer-implemented method of claim 1, further comprising:

generating, in response to receiving the first request to encrypt data, a third tier of keys associated with a third node, wherein the third node is associated with a third data store that stores an encrypted version of a third key, and wherein the first key is configured to decrypt an encrypted version of the third key; and encrypting the data using a decrypted version of the third key.

8. A system comprising:

a first computer data repository that stores an encrypted version of a first key and a parent key identifier associated with the first key, the first computer data repository comprising a non-transitory storage device; and a first computing system comprising one or more first computing devices, the first computing system in communication with the first computer data repository and programmed to implement:

a network interface configured to receive, from a requesting device, a first request to encrypt data, wherein the first request comprises the data;

a data retriever configured to retrieve the encrypted version of the first key and the parent key identifier from the first computer data repository, wherein the parent key identifier identifies a parent key stored in a second computer data repository that is configured to decrypt the encrypted version of the first key, wherein the network interface is further configured to transmit, to a second computing system comprising one or more second computing devices, a second request to decrypt the encrypted version of the first key, wherein the second request comprises the encrypted version of the first key and the parent key identifier, wherein the network interface is further configured to receive, from the second computing system, a decrypted version of the first key, and wherein the second computing system generates the decrypted version of the first key using the parent key;

an encrypter configured to encrypt the data using the decrypted version of the first key; and a literal key identification generator configured to generate a key identifier associated with the first key, wherein the network interface is further configured to transmit, to the requesting device, the encrypted data and the key identifier.

9. The system of claim 8, wherein the network interface is further configured to store the decrypted version of the first key in a computer memory cache.

10. The system of claim 9, wherein the first computing system is further programmed to implement a decrypter configured to receive, from the requesting device, a third request to decrypt the encrypted data, wherein the third request comprises the encrypted data and the key identifier, wherein the decrypter is further configured to determine that the key identifier is associated with the first key, wherein the data retriever is further configured to retrieve the decrypted version of the first key from the computer memory cache, wherein the decrypter is further configured to decrypt the encrypted data using the decrypted version of the first key, and wherein the network interface is further configured to transmit, to the requesting device, the decrypted data.

11. The system of claim 8, wherein the first computing system is further programmed to implement a literal key generator configured to generate a second key in response to a determination that the first key can no longer be used to encrypt the data.

12. The system of claim 11, wherein the network interface is further configured to transmit, to the second computing system, a third request to encrypt the second key, wherein the third request comprises the second key and the parent key identifier, wherein the network interface is further configured to receive, from the second computing system, an encrypted version of the second key, wherein the literal key identification generator is further configured to update the key identifier so that the key identifier is associated with the second key, wherein the data retriever is further configured to store the encrypted version of the second key in the first computer data repository, wherein the data retriever is further configured to associate the parent key identifier with the second key, wherein the encrypter is further configured to encrypt the data using the second key, and wherein the network interface is further configured to transmit, to the requesting device, the encrypted data and the updated key identifier.

13. The system of claim 11, wherein the literal key generator is configured to determine that the first key can no longer be used to encrypt the data if one of an amount of data encrypted by the first key has exceeded a first threshold value or a number of times that the first key has been used to encrypt all data has exceeded a second threshold value.

14. The system of claim 8, wherein the computing system is further programmed to implement a tier generator configured to access, in response to reception of the first request to encrypt data, a third computing system comprising one or more third computing devices and a third computer data repository, wherein the third computer data repository stores an encrypted version of a third key, and wherein the first key is configured to decrypt an encrypted version of the third key.

15. The system of claim 14, wherein the encrypter is further configured to encrypt the data using a decrypted version of the third key.

16. A computer storage system comprising a non-transitory
storage device, said computer storage system having stored thereon executable
program instructions that direct a computer system to at least:
receive, from a requesting device, a first request to encrypt data, wherein the first request
comprises the data;
retrieve an encrypted version of a first key and a parent key identifier from a computer
data repository, wherein the parent key identifier identifies a parent key stored in the computer
data repository that is configured to decrypt the encrypted version of the first key;
transmit, to a second computer system, a second request to decrypt the encrypted version
of the first key, wherein the second request comprises the encrypted version of the first key and
the parent key identifier;
receive, from the second computer system, a decrypted version of the first key, wherein
the second computing system generates the decrypted version of the first key using the parent key;
encrypt the data using the decrypted version of the first key;
generate a key identifier associated with the first key; and
transmit, to the requesting device, the encrypted data and the key identifier.

17. The computer storage system of claim 16, wherein the executable program instructions further direct the computer system to at least store the decrypted version of the first key in a computer memory cache.

18. The computer storage system of claim 17, wherein the executable program instructions further direct the computer system to at least:
receive, from the requesting device, a third request to decrypt the encrypted data, wherein the third request comprises the encrypted data and the key identifier;
determine that the key identifier is associated with the first key;
retrieve the decrypted version of the first key from the computer memory cache;
decrypt the encrypted data using the decrypted version of the first key; and
transmit, to the requesting device, the decrypted data.

19. The computer storage system of claim 16, wherein the executable program instructions direct the computer system to generate a second key in response to a determination that the first key can no longer be used to encrypt the data.

20. The computer storage system of claim 19, wherein the executable program instructions further direct the computer system to at least:
transmit, to the second computing system, a third request to encrypt the second key, wherein the third request comprises the second key and the parent key identifier;
receive, from the second computing system, an encrypted version of the second key;
update the key identifier so that the key identifier is associated with the second key;
store the encrypted version of the second key in the computer data repository;
associate the parent key identifier with the second key;
encrypt the data using the second key; and
transmit, to the requesting device, the encrypted data and the updated key identifier.

21. The computer storage system of claim 19, wherein the executable program instructions further direct the computer system to at least determine that the first key can no longer be used to encrypt the data if one of an amount of data encrypted by the first key has exceeded a first threshold value or a number of times that the first key has been used to encrypt all data has exceeded a second threshold value.

22. A computer-implemented method of decrypting data, the method comprising:
receiving, by a first computing system from a requesting device, a first request to decrypt encrypted data, wherein the first request comprises the encrypted data and a key identifier;
determining that the key identifier is associated with a first key;
retrieving, from a data store, an encrypted version of the first key and a parent key identifier that is associated with the first key;
transmitting, to a second computing system, a second request to decrypt the encrypted version of the first key, wherein the second request comprises the encrypted version of the first key and the parent key identifier;
receiving, from the second computing system, a decrypted version of the first key, wherein the second computing system generates the decrypted version of the first key using the parent key;
decrypting the encrypted data using the decrypted version of the first key; and
transmitting, to the requesting device, the decrypted data.

23. The computer-implemented method of claim 22, further comprising decrypting the encrypted data using the decrypted version of the first key even if use of the first key is revoked.

24. The computer-implemented method of claim 22, further comprising storing the decrypted version of the first key in a memory cache.

25. The computer-implemented method of claim 24, further comprising:
receiving, from the requesting device, a third request to decrypt encrypted second data, wherein the third request comprises the encrypted second data and a second key identifier;
determining that the second key identifier is associated with a second key;
retrieving, from the data store, an encrypted version of the second key and the key identifier that is associated with the second key;
determining that the key identifier is associated with the first key;

retrieving, from the memory cache, the decrypted version of the first key;
decrypting the encrypted version of the second key using the decrypted version of the first key;
decrypting the encrypted second data using the decrypted version of the second key; and
transmitting, to the requesting device, the decrypted second data.

\* \* \* \* \*